(12) United States Patent
Ein (10) Patent No.: US 10,081,237 B2
(45) Date of Patent: Sep. 25, 2018

(54) ADJUSTABLE AND FLEXIBLE RECREATIONAL OR LARGE VEHICLE COVER AND MOUNTING ANCHOR SYSTEM

(71) Applicant: COVERCRAFT INDUSTRIES, LLC, Pauls Valley, OK (US)

(72) Inventor: Morgan Ein, Valencia, CA (US)

(73) Assignee: COVERCRAFT INDUSTRIES, LLC, Pauls Valley, OK (US)

( * ) Notice: Subject to any disclaimer, the term of this patent is extended or adjusted under 35 U.S.C. 154(b) by 40 days.

(21) Appl. No.: 14/879,009

(22) Filed: Dec. 28, 2015

(65) Prior Publication Data

US 2016/0107516 A1    Apr. 21, 2016

Related U.S. Application Data

(60) Provisional application No. 62/061,297, filed on Oct. 8, 2014.

(51) Int. Cl.
*B60J 11/04* (2006.01)
*B60P 3/34* (2006.01)

(52) U.S. Cl.
CPC ............. *B60J 11/04* (2013.01); *B60P 3/343* (2013.01)

(58) Field of Classification Search
CPC .................................. B60J 11/04; B60P 3/343
See application file for complete search history.

(56) References Cited

U.S. PATENT DOCUMENTS

| | | | | |
|---|---|---|---|---|
| 4,655,236 A * | 4/1987 | Dorame | ................. | E04H 6/025 135/88.06 |
| 4,683,902 A * | 8/1987 | Wilson | ..................... | E04H 6/04 135/120.1 |
| 4,834,128 A * | 5/1989 | Burgess | ................... | B60J 11/02 135/117 |
| 5,154,254 A * | 10/1992 | Thompson | ............. | G01V 1/147 181/114 |
| 5,240,305 A * | 8/1993 | Trethewey | .............. | B60J 11/00 296/136.11 |
| 5,522,409 A * | 6/1996 | May | ......................... | B60J 11/00 135/126 |
| 6,148,488 A * | 11/2000 | Gristock | ............... | E04H 15/646 160/392 |
| 6,681,786 B2 * | 1/2004 | Ju | .......................... | E04H 15/48 135/118 |
| 7,604,016 B2 * | 10/2009 | Songest | .................... | E04H 6/04 135/117 |
| 8,607,810 B1 * | 12/2013 | Chung | ...................... | E04H 6/04 135/88.06 |
| 8,752,564 B1 * | 6/2014 | Belden | ..................... | E04H 6/04 135/137 |
| 8,915,258 B1 * | 12/2014 | Beam | .................... | E04H 15/001 135/117 |

* cited by examiner

*Primary Examiner* — Tri Mai
(74) *Attorney, Agent, or Firm* — Buchalter; Kari L. Barnes (57) ABSTRACT

A vehicle covering system is provided with an anchoring system, a covering portion, and a securing system to removably couple the covering portion to the anchoring system.

5 Claims, 7 Drawing Sheets

ADJUSTABLE AND FLEXIBLE RECREATIONAL OR LARGE VEHICLE COVER AND MOUNTING ANCHOR SYSTEM

PRIORITY

This application claims priority to U.S. Application No. 62/061,297, filed Oct. 8, 2014, which is incorporated by reference in its entirety into this application.

FIELD

The field of the subject matter is adjustable and flexible recreational or large vehicle covers and mounting anchor systems, specifically including covers for recreational vehicles.

BACKGROUND

Recreational vehicles have become more popular as families and retirees look to travel closer to home by road, travel with more of the comforts of home, including pets, or a combination of both. Recreational vehicles or RVs can span the size of being the size of a van all the way up to the size of a large bus. Travelers also have the option of buying a recreational vehicle or renting one, depending on the travel needs at the time. While many variations of recreational vehicles are manufactured, Class "A" and "Bus" style recreational vehicles are defined as those that are manufactured on a large truck chassis distinguished by the fact that the driving area can be accessed from the living space or vehicle interior while standing. Other recreational vehicles are those that are pulled or towed behind a car or truck.

There are times of the day (or night) where the travelers need to cover recreational vehicle. In some instances, travelers may want to cover the RV at a stop or campground in order to keep sunshine out and the interior of the vehicle cool or to keep the RV clean and protected, including keeping the top of the RV from becoming weathered or damaged. At other times of the day, travelers cover the RV to keep outsiders from being able to look inside of the interior of the vehicle, such as at night or when they are qway from the RV. Finally, travelers who own their recreational vehicles need to protect the RV when the vehicle isn't in use or is in storage. Suitable covers should also be adjustable and flexible, while being easily stored and cleaned. The adjustable feature is critical, in that travelers may need to use the RV cover on a number of different types and sizes of recreational vehicles. The flexibility feature is also critical, in that a hard or stiff RV cover is likely going to leave gaps between the cover or may scratch or damage the paint of the RV. The flexibility feature is also critical for storage. In a recreational vehicle, there is very little room to store anything, and therefore, any suitable RV cover must be able to roll or fold up in order to be easily stored in a small space, such as under a seat, in a glove compartment or another small space.

At this point, there are very few options for a RV owner or operator to securely cover his or her RV or different types of RVs with a secure, adjustable cover that is easy to use, simple to adjust and won't damage the paint or finish of the RV. To this end, it would be desirable to develop, produce and utilize an adjustable and flexible recreational or large vehicle cover that: a) can be used on a number of different types and sizes of recreational vehicles, b) can be adjusted so that it will not leave gaps between the cover and the top of the RV, but is designed so that the straps and the sides of the cover are fixed away from the body of the RV, c) can be easily cleaned, d) does not require drilling of snaps or twist grommets into the body of the vehicle, e) can roll up or fold up in order to be easily stored in a small space, such as under a 20 seat, in a glove compartment or another small space, and f) can be used in all climate and wind conditions to protect the RV when the RV is in a parked configuration.

SUMMARY

Exemplary embodiments provided here include covers for large and recreational vehicles in which an anchoring system may be used to securely attach a cover portion over the vehicle while maintaining a portion of the covering system away from sides, edges, or portions of the covered vehicle to reduce or prevent wear or damage to the underlying surface.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

An adjustable and flexible recreational or large vehicle and/or towed trailer cover has been developed and is described herein that: a) can be used on a number of different types and sizes of recreational vehicles, b) can be adjusted so that it will not leave gaps between the cover and the top of the RV, but is designed so that the straps and the sides of the cover are fixed away from the body of the RV, c) can be easily cleaned, d) does not require drilling of snaps or twist grommets into the body of the vehicle, e) can roll up or fold up in order to be easily stored in a small space, such as under a seat, in a glove compartment or another small space, and f) can be used in all climate and wind conditions to protect the RV when the RV is in a parked configuration.

The contemplated RV and large vehicle cover system was specifically designed to provide a cover solution whereby the sides and top of the RV or large vehicle would not be damaged by the sides of the cover or the straps, since the straps must be tight and secure to keep the cover securely on the RV or large vehicle. The contemplated RV and large vehicle cover system was also designed to be easy to use for the owner or user. Finally, as mentioned earlier, any suitable solution had to be something that could easily be rolled up or folded up and stored in a small space. The contemplated embodiments solve all of these issues and provide an elegant solution.

Specifically, a contemplated RV and large vehicle cover system comprises: a) a base assembly comprising a first strap system, b) a second strap system designed to couple a cover with the base assembly, and c) a cover. In additional embodiments, a contemplated RV and large vehicle cover system includes the contemplated cover system outlined above, along with a bag, wherein the bag can be used both as a storage bag and a transport bag that is used to help lift the cover system up to the top of the RV or large vehicle.

A contemplated cover is designed to cover the top of the RV or large vehicle and for all intents and purposes not to cover any of the painted areas of the RV or large vehicle, such as those on the sides. However, an alternative contemplated embodiment could be designed such that the cover covers the top of the RV or large vehicle and the front and back windshields without touching the painted side, front and/or back areas of the RV or large vehicle. Contemplated covers may be made from any suitable material or combination of materials, as long as the materials fulfill the purpose of being a suitable protective cover without damaging the RV or large vehicle. Some contemplated materials include Nylon, Lycra, Spandex, cotton or a combination thereof. The combination of materials may be a combination where the materials are layered and/or where the materials are stitched together in order to address different needs for different parts of the cover.

Contemplated covers may also comprise various flaps or openings that are secured by Velcro, zippers or other securing apparatus, so that the user can open the flap or opening if needed without removing the entire cover. However, it should be understood that in the initial embodiment, the cover and all of the flaps or openings would provide a complete cover over the top of the RV or large vehicle, because any flaps or openings are secure and closed.

Contemplated covers may also comprise a shrink system that is analogous to a pair of sweatpants with a cord. A contemplated cover may have a seam around the edges that has a cord or strap running through it, whereby the cord or strap is pulled after the cover is secured on the RV or large vehicle in order to tighten the sides of the cover.

A contemplated cover comprises a second strap system that is designed to couple the cover with the base assembly, which will be disclosed in detail below. A contemplated second strap system comprises connection or coupling points to the cover. In some embodiments, the second strap system also comprises at least one strap. Each contemplated strap comprises a first end and a second end. The first end of each contemplated strap is connected to or coupled with connection or coupling points on the cover. The second end of each contemplated strap is connected to or coupled with the base assembly.

Each strap that is part of the second strap system may be coupled permanently to the cover through the connection or coupling point or may be releasably connected or coupled to the cover through the connection or coupling point. If the straps are releasably connected or coupled to the cover, it is contemplated that there is a male-female connection or coupling assembly or a hook and eye connection or coupling assembly that is a part of the cover and a part of the first end of each strap, so that they can be releasably connected or coupled to one another. If the straps are permanently connected or coupled with the cover, then it is contemplated that the first end of each strap is sewn in or otherwise permanently and securely attached to the cover at various and strategic connection points.

It should be understood that if the first ends of contemplated straps that are part of the second strap system are permanently connected or coupled with the cover, that it doesn't mean that the second end of the contemplated straps are permanently coupled with the base assembly. As a matter of fact, they are not, but instead are releasably coupled or connected to the base assembly, as will be described in detail below. A contemplated base assembly is the key to the cover system working properly, as will be shown. A contemplated base assembly comprises at least one solid support structure, at least one base strap and at least one connection or coupling point.

A contemplated at least one support structure that is part of the base assembly is designed to—at the very least—rest securely in front of one of the tires on each side of the RV or large vehicle. In other embodiments, the at least one support structure comprises two support structures, wherein one rests in front of one of the tires and the other is designed to rest behind that same tire. Each contemplated support structure is designed to be longer than the width of the tire, which is necessary to hold the second end of the straps that make up the second strap system away from the body of the RV or large vehicle. Each contemplated support structure may comprise a rod or may be a triangular design, such as is found with a wheel block. The key is that the support structure fits securely in front of the tire and/or behind the tire.

Each of the contemplated support structures comprises a first strap system. The first strap system is designed to securely couple the at least one support structure to the tire. If there is one support structure, then a contemplated first strap system may be designed to releasably couple to each end of the support structure and to wrap around the back of the tire. If there are two support structures, then it is understood that each support structure comprises an undercarriage end that is the end that is under the RV or large vehicle and an exposed end that is the end that sticks out and away from the RV or large vehicle. In the case of two support structures, the first strap system comprises a strap that holds the undercarriage end of each support structure together with one another. The first strap system also comprises a second strap that is designed to secure the exposed end of each support structure together with one another.

Figures 1, 1A:
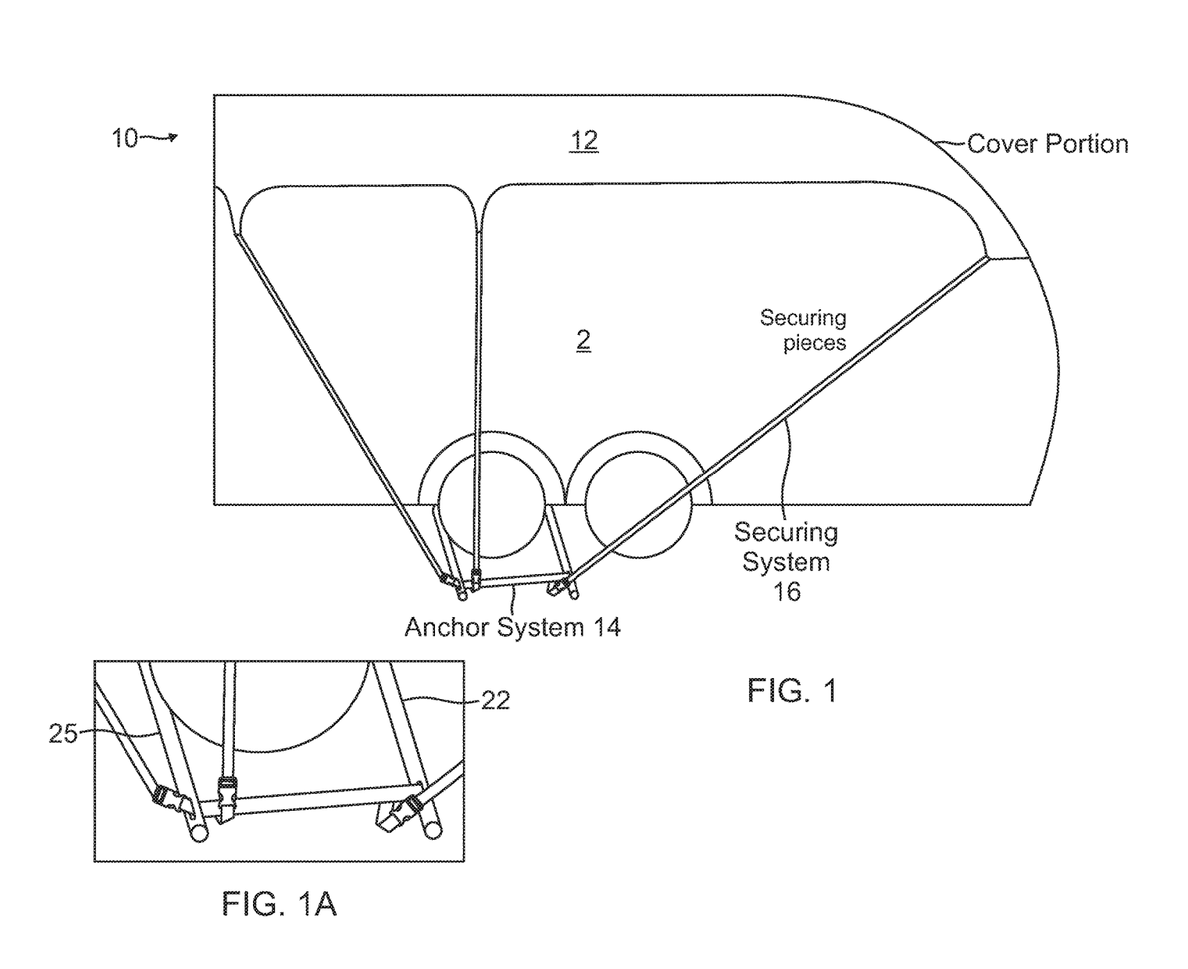
FIGS. 1 and 1A illustrate an exemplary cover system covering a portion of an RV. The exemplary cover system 10 includes a cover portion 12, anchor system 14, and securing system 16
Figure 2:
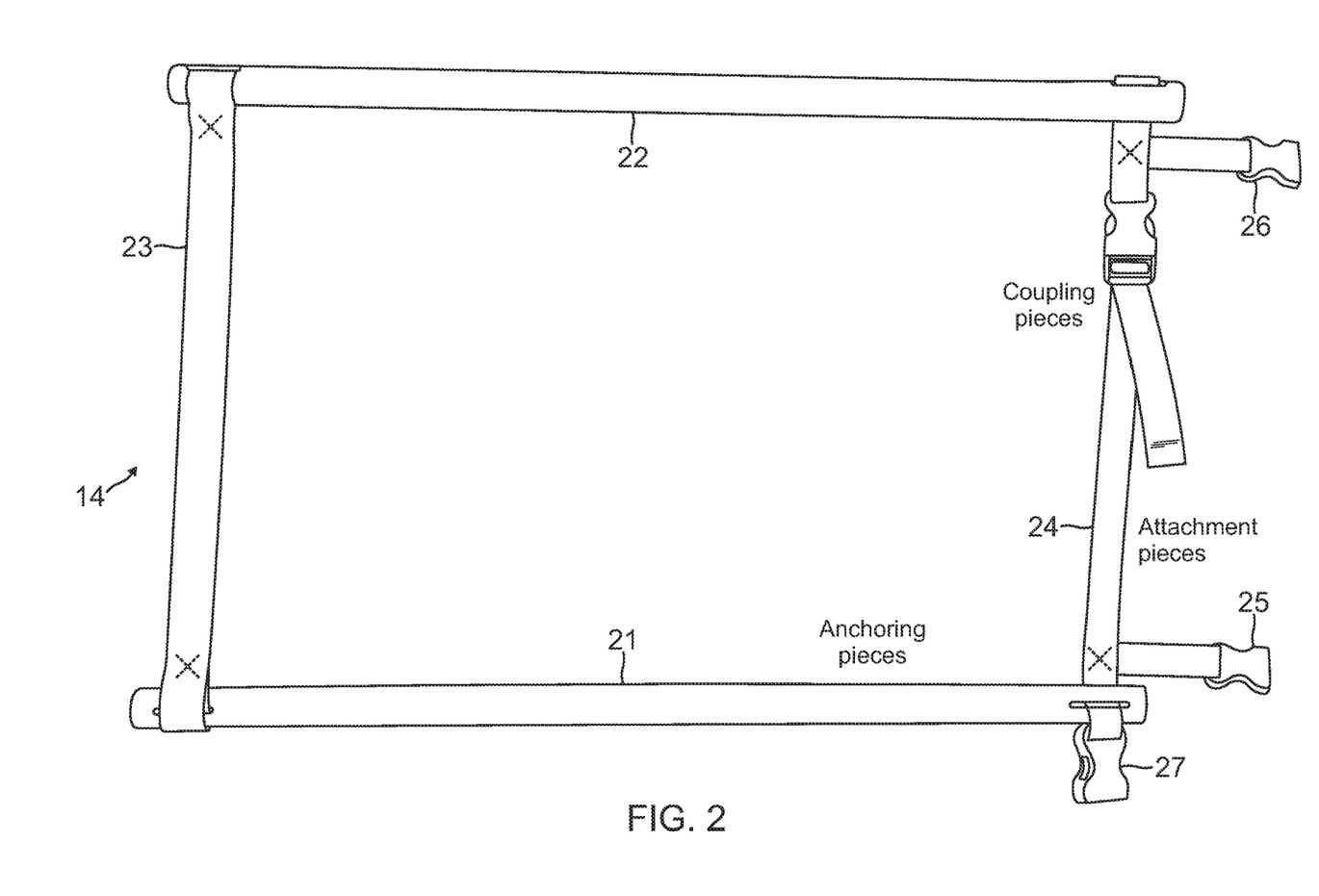
FIG. 2 illustrates an exemplary anchoring system. Anchoring system 14 includes first and second anchoring members 21, 22 and coupling members 23, 24. Additional anchoring members 25, 26, and 27 may also be included.
Figures 3, 3A:
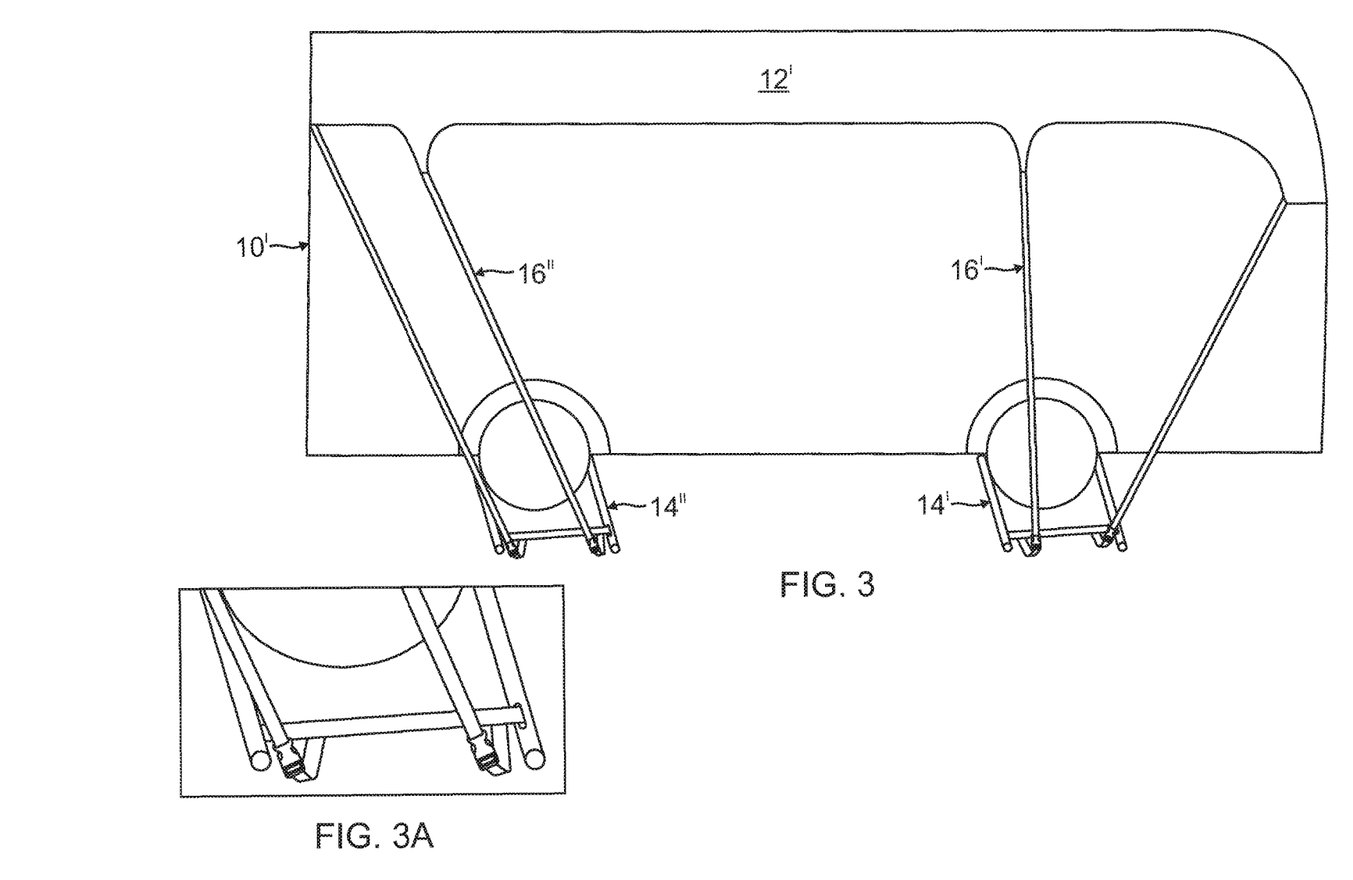
FIGS. 3 and 3A illustrate an exemplary cover system covering a portion of an RV. The exemplary cover system 10' includes a cover portion 12', anchor system 14', 14", and securing system 16', 16".
Figure 4:
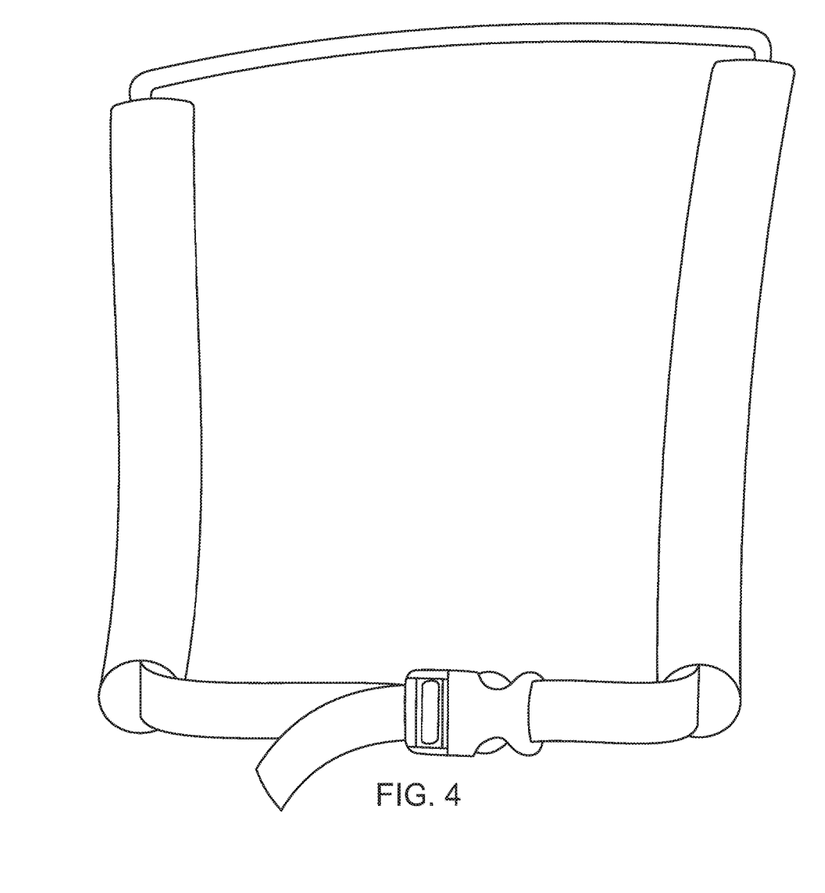
FIG. 4 illustrates an exemplary anchoring system.
Figure 5:
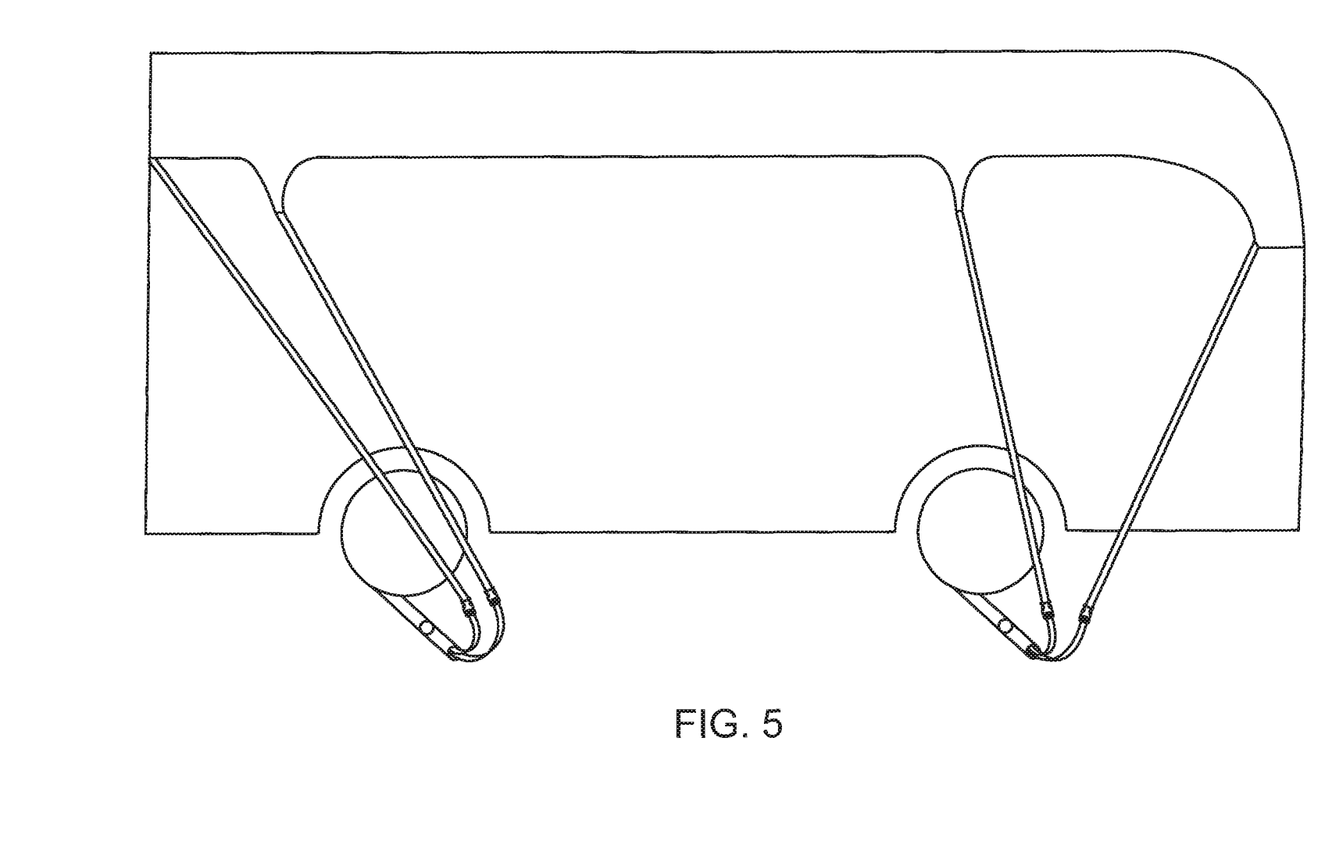
FIGS. 5 and 5A illustrates an exemplary cover system.
Figure 5A:
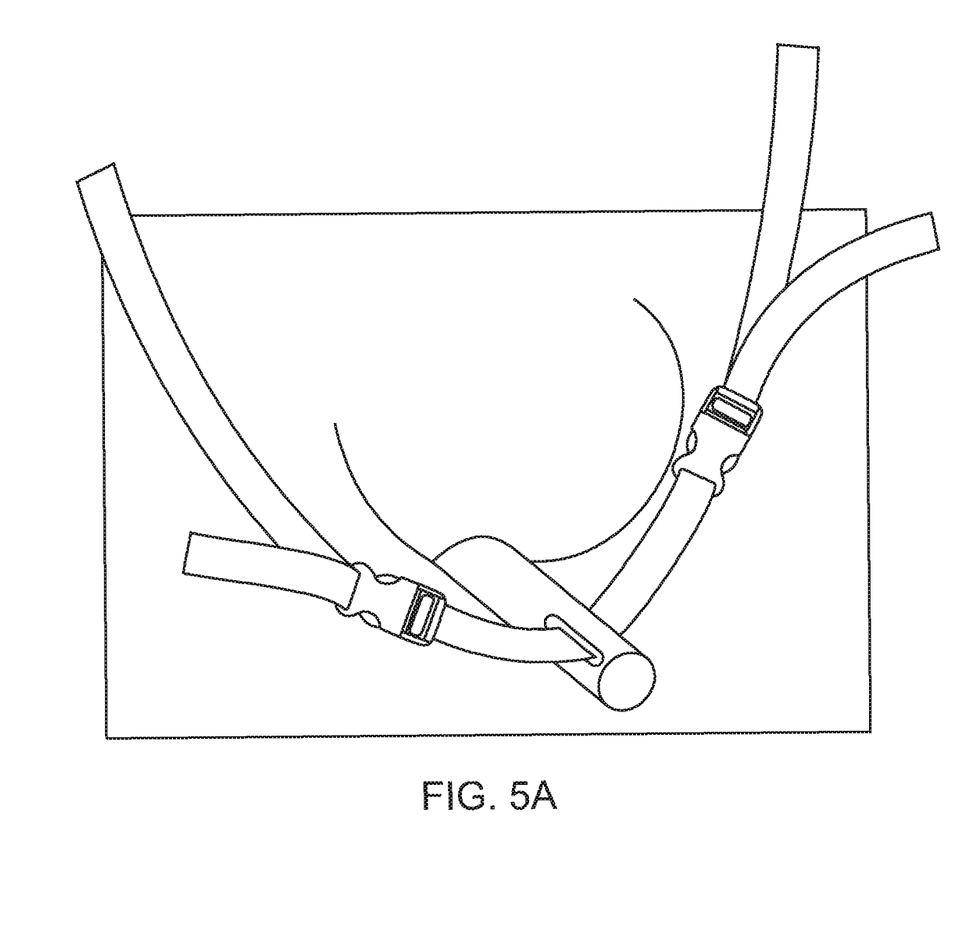
Figure 6:
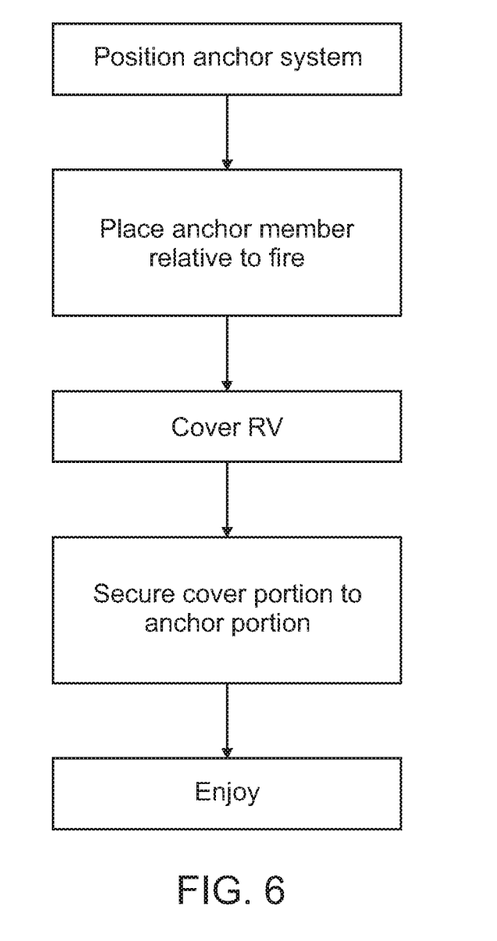
FIG. 6 illustrates an exemplary method of using the cover system.

In practice and in a contemplated embodiment, a user will take the base assembly and place one of the two support structures in front of a tire, such as one of the front tires. The user will then hold the second support structure, wrap it around the undercarriage side of the tire and place it behind the tire. When the user does this, one support structure is in front of the tire, one support structure is behind the tire and the strap attached to each of the undercarriage ends will be connecting the two undercarriage ends to one another under the RV or large vehicle. The user will then use the exposed end strap to connect the exposed ends of each of the support structures to one another tightening it until the support structures are securely against the tire front and back. Once the base assembly is itself secured, then the user will couple or connect the second end of the second strap system straps to the connection points on the base assembly. FIGS. 1, 1A, and 2 show a cover system and base assembly, where the system (FIGS. 1 and 1A) has a three-point connection on the base assembly (FIG. 2) for a travel trailer—which is one that is hooked on to a car or truck. FIGS. 3, 3A and 4 show a cover system, where the system (FIG. 3, 3A) has a two-point connection on the base assembly (FIG. 4) for a RV, wherein there is more than one base assembly as shown.

In contemplated embodiments, one or more of the straps, the webbing and/or the cords disclosed herein may comprise a natural material, a synthetic material or a combination thereof. Contemplated natural materials comprise any suitable material for this application and may include cotton, hemp, wool, leather, suede or a combination thereof. Contemplated synthetic materials comprise any suitable material for this application, including nylon, spandex, lycra or a combination thereof. Suitable structure for the one or more straps, webbing portions and/or cords includes a webbing design, a woven design, a solid design or a combination thereof. The key objectives of the straps, webbing portions and/or cords are at least one of the following: a) flexible, b) durable, c) easy to store and d) non-abrasive—in that the straps, webbing portions and/or cords should not damage the paint or finish significantly.

Methods are also contemplated of using a recreational vehicle cover, comprising: providing a base assembly comprising a first strap system; providing a second strap system designed to couple a cover with the base assembly; providing a cover; coupling the first ends of the second strap system to the cover; opening and applying the cover to the top of a RV or large vehicle; securing the base assembly around at least two of the tires of the RV or large vehicle; coupling the second ends of the second strap system to the first strap system of the base assembly. In other contemplated embodiments, a tightening cord is built in to the cover and is tightened after coupling the second ends of the second strap system to the first strap system of the base assembly. It should be understood, as mentioned throughout this document, that the straps of the second strap system are not touching the sides of the RV or large vehicle, primarily because they are connected to the exposed ends of the base assembly support system.

Thus, specific embodiments of adjustable and flexible recreational or large vehicle covers and their support anchor systems have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A vehicle cover, comprising:
an anchoring system having a rigid member having a length, a second rigid member, and a flexible coupling member, wherein the rigid member and the second rigid member are hollow and the flexible coupling member extends through the rigid member and the second rigid member and the flexible member is separable from itself; and
a covering portion comprising a material sheet with four or more connecting points attached to securing members configured to removably couple to the anchoring system.

2. The vehicle cover of claim 1, wherein the anchoring system further comprises a second flexible coupling member.

3. The vehicle cover of claim 2, wherein the flexible coupling member attaches between terminal ends of the rigid member and the second rigid member and the second flexible coupling member attaches between opposite terminal ends of the rigid member and the second rigid member.

4. The vehicle cover of claim 3, wherein the second flexible coupling member is separable with itself.

5. The vehicle of claim 1, wherein the securing members comprise an adjustable length.

* * * * *